R. MACKAY.
STEAM BOILER.
APPLICATION FILED AUG. 6, 1910.

982,733.

Patented Jan. 24, 1911
2 SHEETS—SHEET 1.

Inventor
Robert Mackay
by Harold Terrell
his atty

R. MACKAY.
STEAM BOILER.
APPLICATION FILED AUG. 6, 1910.
982,733.
Patented Jan. 24, 1911.
2 SHEETS—SHEET 2.
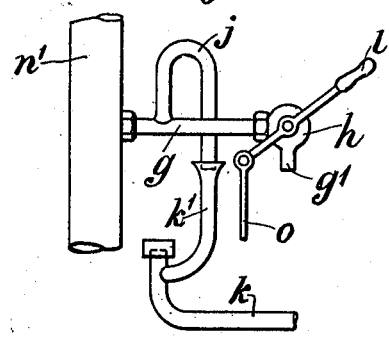
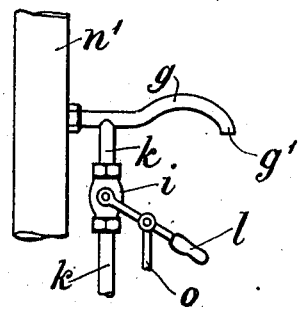
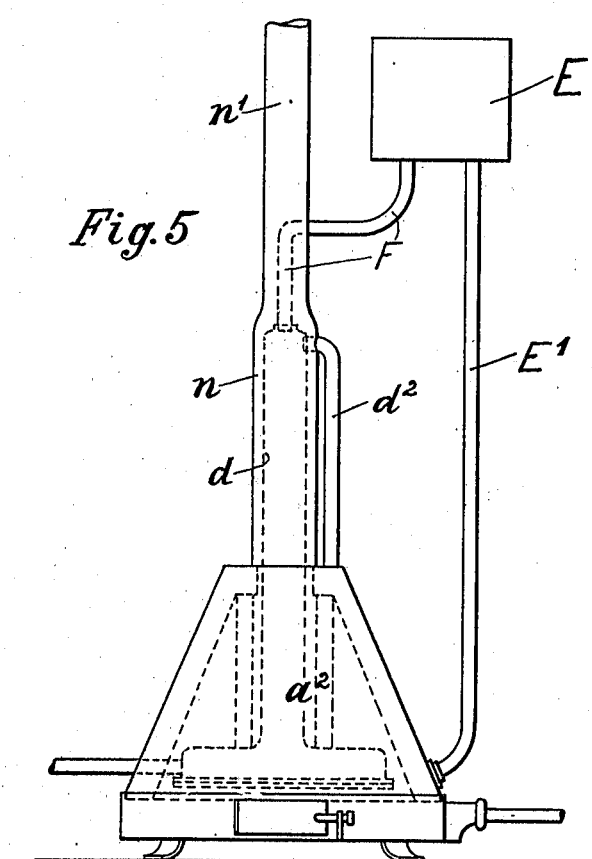

UNITED STATES PATENT OFFICE.

ROBERT MACKAY, OF WALTHAMSTOW, ENGLAND.

STEAM-BOILER.

982,733.  Specification of Letters Patent.  Patented Jan. 24, 1911.

Application filed August 6, 1910. Serial No. 575,980.

*To all whom it may concern:*

Be it known that I, ROBERT MACKAY, a subject of the King of Great Britain, residing at Walthamstow, in the county of Essex, England, have invented new and useful Steam-Boilers, of which the following is a specification.

This invention relates more particularly to that type of apparatus which is used in refreshment houses for supplying boiling water, in which the water is freshly boiled every time it is drawn off, in which it is impossible to obtain a dangerous steam pressure, and from which no steam escapes into the room where the apparatus is placed.

The objects of this invention are:—1. To construct an improved apparatus of this type in which the water may be heated entirely by gas or other fuel or by electricity or by one of such means in combination with steam heating pipes, or by steam heating pipes alone. 2. To construct apparatus which is very readily repaired and cleaned. 3. To construct apparatus which is rapid and certain in action. 4. To construct apparatus which, with small modifications may be used for heating water in a circulating tank for washing up and other purposes, which circulating water, generally speaking, would not reach the boiling temperature, and which, with other modifications, may be used for producing steam.

According to the present invention, I employ an outer conical vessel and I connect the upper part of this vessel with a shallow vessel located within the conical vessel by hollow columns open at their bottom and provided with a small vent at their top. These columns inclose small water tubes open at both ends. I also provide the shallow vessel with a central dome.

The invention is illustrated in the accompanying drawings, in which:—

Figure 1:
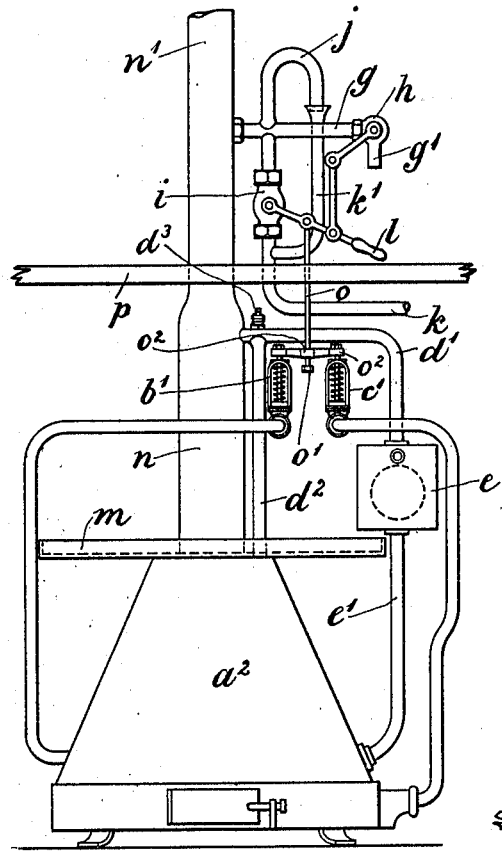
Figure 2:
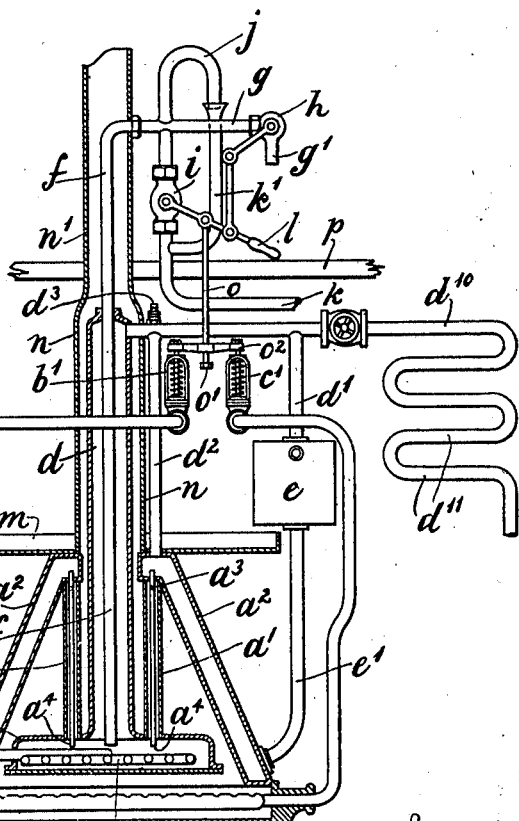

Figure 1 is an elevation of one form of the complete apparatus and Fig. 2 is a vertical section of the same. Figs. 3 and 4 are elevations of the delivery branch and parts adjacent thereto, showing two modifications of the apparatus shown in Fig. 1. Fig. 5 shows the apparatus employed for heating water in a circulating tank.

The apparatus will first be described in the form in which it is used for producing freshly boiled water, as shown in Figs. 1 and 2. The apparatus comprises a shallow vessel $a$, which may be provided in its interior with a steam heating coil $b$, and it may be provided underneath with any other suitable heating means, such as a gas ring $c$. Coal or other fuel or electrical heating means may, however, be employed in place of the gas ring. From the top of this shallow vessel $a$ rise a number of vertical hollow columns $a'$, which connect the shallow vessel $a$ with the upper part of a conical shaped vessel $a^2$, which latter surrounds the vertical columns $a'$ and shallow vessel $a$. The vertical hollow columns $a'$ are open at their lower ends and communicate with the shallow vessel $a$ but are closed at their upper ends except for a small vent $a^3$ communicating with the said conical shaped vessel $a^2$. Passing completely through these columns $a'$ and open at both ends, are placed water tubes $a^4$ which form a water connection between the shallow vessel $a$ and the outer conical vessel $a^2$. The tubes $a'$ protect the water tubes $a^4$ from the direct heat of the gases. From the top of the shallow vessel $a$ extends a dome $d$ which is open at its lower part to the shallow vessel $a$ and has an opening at or near its top to receive the end of a steam pipe. One branch $d'$ of this steam pipe communicates with the top of the feed water cistern $e$, which is provided with a float valve to regulate the height of water in the dome $d$, and another branch $d^2$ of this pipe communicates with the top of the conical vessel $a^2$. A pipe $e'$ communicates between the lower part of the feed water cistern $e$ and the lower part of the conical vessel $a^2$. The delivery pipe $f$ for the boiling water has an open end projecting into the shallow vessel $a$ and it passes up through the dome $d$ and out of the top of the dome, where it terminates with a delivery branch $g$. This delivery branch $g$, as shown in Fig. 1, is provided with two valves $h$ and $i$ and a vent pipe $j$. One valve, $i$, is on the lower side of the delivery branch $g$ and is connected with a waste water pipe $k$. The steam vent pipe $j$ leads from the top of the delivery branch $g$ downward and is connected with the waste water pipe $k$ below its valve $i$. The other valve $h$ is located near the delivery nozzle $g'$.

If the apparatus be provided with a steam coil $b$ as well as a gas ring $c$, the steam valve $b'$ and gas valve $c'$, and the other two valves $h$, $i$, are all simultaneously operated by a single lever $l$, or other mechanism. When it is desired to draw boiling water, the steam, gas and delivery valves $b'$, $c'$, and $h$, are opened and the waste water valve $i$ is closed. The water then boils and generates steam which forces the water up the delivery pipe $f$ into the delivery branch $g$.

When sufficient water has been drawn, the lever $l$, or other mechanism, is reversed, the steam, gas and delivery valves are closed, and the waste water valve $i$ is opened. This reversal immediately cuts off the flow of boiling water and shuts off the heat. Any water remaining in the delivery branch, or entering said branch after the heat is cut off, flows away down the waste water pipe $k$. Means are provided to prevent the waste water pipe acting as a siphon. For instance the steam vent pipe $j$ may enter the open end of a pipe $k'$ which connects with the waste water pipe $k$ below the valve $i$.

A suitable valve $d^3$ is connected with the upper part of the dome $d$ to allow the air contained therein to escape while the water is being boiled and to allow air to again enter the dome when the heat is shut off, and thereby prevent a partial vacuum being formed in the dome.

The upper part of the conical vessel $a^2$ may be closed by a readily detachable disk $m$, which also acts as a tray upon which to stand tea-pots or other articles to be warmed. When this disk $m$ is removed the conical vessel $a^2$ and the vertical water pipes $a^4$ are accessible for cleansing. The bottom of the shallow vessel $a$ is also readily detachable thereby rendering the vertical columns $a'$, the dome $d$ and the delivery pipe $f$ accessible for cleaning.

When gas or other fuel is employed, the products of combustion strike against the bottom of the shallow vessel $a$ and pass upward between said shallow vessel $a$ and the conical vessel $a^2$. They also pass around the vertical columns $a'$ and enter a casing $n$ surrounding the dome $d$ from which they escape by means of a flue $n'$ into the outer air.

When the apparatus is used for generating steam or for heating the water in a circulating tank, the water delivery pipe $f$, the waste water valve $i$ and the delivery valve $h$ are no longer necessary. When the apparatus is used for generating steam, a branch $d'^0$ is taken from the steam pipe $d'$ to deliver steam to the steam heating pipes $d''$ or wherever the steam may be required. When the apparatus is used for heating water in a circulating tank, the dome $d$, as shown in Fig. 5, is connected at its top by a pipe, such as F, with the circulating tank E, which is fixed above the level of the top of the dome $d$, and the tank E is connected by a pipe such as E' direct with the lower part of the conical vessel $a$. The circulating tank takes the place of the feed water tank $e$, above mentioned. The branch $d'$ of the steam pipe is no longer necessary, but the steam pipe $d^2$ is employed to allow the steam and air to escape from the conical vessel $a^2$ into the dome $d$.

Fig. 3 shows a modification in which the waste water valve $i$ is omitted. In this construction, when the delivery valve $h$ is opened by operating the lever $l$, the gas valve $c'$ and steam valve $b'$ are also opened. When these valves are closed any boiling water which continues to flow, passes through the pipes $j$ and $k'$ into the waste pipe $k$.

Fig. 4 shows a further modification in which the delivery valve $h$ is omitted. In this construction, when the waste valve $i$ is closed, the gas and steam valves are opened. The first water which is delivered and which may not be at the boiling temperature, flows into that part of the waste pipe $k$ above the valve $i$. If necessary, this part of the pipe $k$ may be of large diameter, or it may be elongated. When this part of the pipe $k$ is full, the boiling water then escapes at the delivery orifice $g'$. As soon as the waste valve $i$ is opened, any water which may continue to flow will pass into the waste pipe $k$ owing to the delivery branch $g$ being curved above the level of the top of the waste pipe $k$.

The rod $o$, provided at its lower end with a nut or enlargement $o'$, passes through a cross bar $o^2$ connecting the gas and steam valves. This rod $o$ is of such a length that the lever $l$ first operates the waste and delivery valves, or one of them, before the nut $o'$ comes into contact with the bar $o^2$ and opens the steam and gas valves. When the lever $l$ is reversed, the gas and steam valves first close under the action of their springs, after which the lever $l$ causes the waste and delivery valves, or one of them, to be operated according to the construction of the apparatus.

$p$ represents an ordinary shop counter.

What I claim is:—

1. In a steam boiler, the combination of a conical vessel into which the cold water is delivered and partly heated, a shallow vessel surrounded by the lower part of the conical vessel and in which the water is boiled, hollow columns connecting the upper part of the conical vessel and the upper part of the shallow vessel, said columns being open at their bottom and provided with small vent holes at their top, water tubes down which the water passes and open at both ends, said water tubes passing through said hollow columns, a dome connected to the upper part of the shallow vessel and passing up freely through the upper part of the conical vessel.

2. In a steam boiler, the combination of a shallow vessel, a conical shaped vessel surrounding the shallow vessel, a number of hollow columns connecting the two vessels, said columns being open at their bottoms and provided with a small vent at their top, water tubes open at both ends passing through said hollow columns, a dome connected to the top of the shallow vessel, means for heating the shallow vessel, a delivery pipe open at both ends passing up through the dome the upper end being the delivery orifice and the lower end entering the shallow vessel, a waste pipe connected to said delivery pipe, and means for putting the heating apparatus in action to cause the water to flow through the delivery orifice, substantially as set forth.

3. In a steam boiler, the combination of a shallow vessel, a conical shaped vessel surrounding the shallow vessel, a number of hollow columns connecting the two vessels said columns being open at their bottoms and provided with a small vent at their top, water tubes open at both ends passing through said hollow columns, a dome connected to the top of the shallow vessel, means for heating the shallow vessel, a delivery pipe open at both ends passing up through the dome the upper end being the delivery orifice and the lower end entering the shallow vessel, a waste pipe connected to said delivery pipe, a valve on said waste pipe, and means for closing said valve and for putting the heating apparatus in action, substantially as set forth.

4. In a steam boiler, the combination of a shallow vessel, a conical shaped vessel surrounding the shallow vessel, a number of hollow columns connecting the two vessels said columns being open at their bottom and provided with a small vent at their top, water tubes open at both ends passing through said hollow columns, a dome connected to the top of the shallow vessel, means for heating the shallow vessel, a circulating tank, a pipe connecting the upper part of the dome with the said tank, and a pipe connecting the lower part of the said tank with the lower part of the conical vessel, substantially as set forth.

In witness whereof I have hereunto set my hand in presence of two witnesses.

ROBERT MACKAY.

Witnesses:
 WM. GIRLING,
 ROBT. B. PLAYFORD.